United States Patent
Miyazaki et al.

(10) Patent No.: US 7,441,115 B2
(45) Date of Patent: Oct. 21, 2008

(54) METHOD FOR VERIFYING A DIGITAL SIGNATURE

(75) Inventors: Kunihiko Miyazaki, Yokohama (JP); Narihiro Omoto, Toda (JP); Shinji Itoh, Yokohama (JP); Kouichi Tanimoto, Yokohama (JP); Hiroshi Yoshiura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 668 days.

(21) Appl. No.: 10/620,808

(22) Filed: Jul. 17, 2003

(65) Prior Publication Data

US 2004/0123107 A1    Jun. 24, 2004

Related U.S. Application Data

(63) Continuation-in-part of application No. 09/693,713, filed on Oct. 19, 2000, now Pat. No. 7,305,558.

(30) Foreign Application Priority Data

| Oct. 22, 1999 | (JP) | 11-301216 |
| Mar. 17, 2000 | (JP) | 2000-081712 |
| Jul. 17, 2002 | (JP) | 2002-207696 |
| Jan. 31, 2003 | (JP) | 2003-022985 |

(51) Int. Cl.
    *H04L 9/00*    (2006.01)
(52) U.S. Cl. .................... 713/156; 713/157; 713/158; 713/175; 713/176; 713/180; 380/286
(58) Field of Classification Search ......... 713/156–158, 713/175–176, 180; 380/286
    See application file for complete search history.

(56) References Cited

U.S. PATENT DOCUMENTS

5,956,404 A    9/1999    Schneier et al.

(Continued)

FOREIGN PATENT DOCUMENTS

EP    1 094 424 A2    4/2001

(Continued)

OTHER PUBLICATIONS

Herda, S., "Non-Repudiation: Constituting evidence and proof in digital cooperation", Computer Standards and Interfaces, 1995, vol. 17, pp. 69-79.*

(Continued)

*Primary Examiner*—Minh Dieu Nguyen
(74) *Attorney, Agent, or Firm*—McDermott Will & Emery LLP

(57) ABSTRACT

The invention provides a method for verification having a structure that reflects reliability of a signature history properly for a hysteresis signature used for verification based on the signature history, and provides a method for arbitration and an arbitrator apparatus that solve a dispute on correctness of a signature based on the method for verification. Furthermore, the invention provides a method for managing history that mitigates the signature history management burden on a signer. Reliability is set on a signature forming record that is a component of a signature history, reliability of the signature history is calculated based on the set reliability, and the calculated reliability is output as reliability of a verification result. The invention provides a method for verification having a structure that reflects the reliability of a signature history properly and a method for arbitration and an arbitrator apparatus that solve a dispute on correctness of a signature. Furthermore, providing a signature history storage service apparatus mitigates the signature history storage burden on a signer.

9 Claims, 11 Drawing Sheets

U.S. PATENT DOCUMENTS 7,010,683 B2 * 3/2006 Corella .................. 713/156
7,162,635 B2 * 1/2007 Bisbee et al. ............ 713/176

FOREIGN PATENT DOCUMENTS

| JP | 2001-331104 | 11/2001 |
| JP | 2002-175009 | 6/2002 |
| JP | 2002-335241 | 11/2002 |

OTHER PUBLICATIONS

K. Miyazaki et al., "A Method for Evaluating Reliability of Digital Signature Schemes with Linking Structure", PSJ Signotes Computer Security Abstract Jul. 28, 2002, XP002265338, p. 1.

N. Asokan et al., "Server-Supported Signatures", Proceedings of the European Symposium on Research in Computer Security (ESORICS), Springer Verlag, Berlin, DE, Sep. 1996, XP000972234, pp. 131-143.

Xuhua Ding et al., "Experimenting with Server-Aided Signatures", Internet Soc. Ninth Annual Symposium on Network and Distributed System Security, Feb. 8, 2002 XP002265339, pp. 1-15.

* cited by examiner

F I G. 1
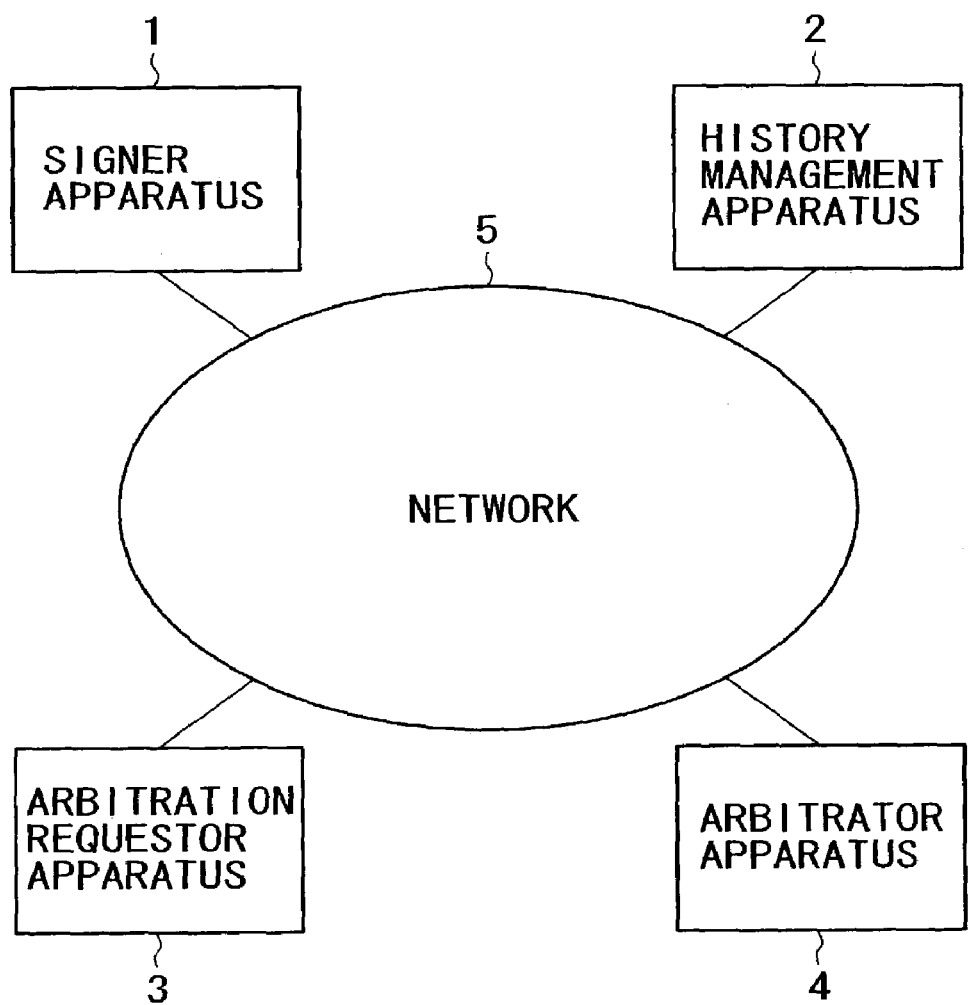

METHOD FOR VERIFYING A DIGITAL SIGNATURE

PRIORITY APPLICATION

This application claims the benefit of priority under 35 U.S.C. § 120 as a continuation in part of prior filed U.S. application Ser. No. 09/693,713 filed on Oct. 19, 2000, now U.S. Pat. No. 7,305,558, which claims foreign application priority to JP 11-301216 filed Oct. 22, 1999 and to JP 2000-081712 filed Mar. 17, 2000. This application also claims priority under 35 U.S.C. § 119 from Japanese Patent 2002-207696, filed Jul. 17, 2002, and from Japanese Patent Application No. 2003-022985 filed Jan. 31, 2003, the disclosure of which also is entirely incorporated herein by reference.

BACKGROUND OF THE INVENTION

1. Field of the Invention

This invention relates to information security.

2. Description of the Related Art

A technique has been known heretofore as a technique to improve the security of a digital signature in which the record of a signature is kept as a history when it is issued, the history data is reflected on a signature when the signature is to be issued newly to thereby build a logical chain relation between these signatures (referred to as hysteresis signature depending on the case).

The above-mentioned hysteresis signature technique is disclosed in Japanese Published Unexamined Patent Application No. 2001-331104.

A technique to provide a service for preventing denial of document preparation and transmission by a reliable third party organization is disclosed in, for example, ISO (the International Organization for Standardization) and IEC (the International Electrotechnical Commission), "INTERNATIONAL STANDARD ISO/IEC 13888-2 Information technology—Security techniques—Non-repudiation—Part 2: Mechanisms using symmetric techniques", first edition, (Switzerland), 1998.4.1.

The above-mentioned hysteresis signature technique involves a method in which the signature history relating to the signature is used when the signature is verified. Therefore, a hysteresis signature verification method that reflects reliability of the signature history adequately has been desired.

It is a heavy burden for general signatures and signer side apparatus to store signature histories issued by means of the above-mentioned hysteresis signature for long time. Therefore, a storing method for mitigating the burden for storing signature histories of general users has been desired.

The ISO/IEC document discloses denial prevention service in which a token for guaranteeing the existence of the data to be guaranteed that has been sent to a reliable third party organization is issued and sent back, but does not discloses the data storage. Furthermore, the above-mentioned service is insufficient in checking of the signature history of verification target data as the service to guarantee the validity of the hysteresis signature.

SUMMARY OF THE INVENTION

The present invention provides a hysteresis signature verification method that reflects the reliability of the signature history adequately.

Furthermore, the present invention provides a service to realize a technique in which a signature history (referred to as signature issuing history depending on the case) is stored reliably for a relatively long time in a storage instead of the signer side apparatus to thereby mitigate, the burden for storing signature histories in a signer side apparatus.

Furthermore, a signature history storage service provider side apparatus verifies consistency of the signature history data that is required from a signer side apparatus to be registered with the data that has been issued before by the signer side apparatus and has already been stored in the signature history storage service provider side apparatus when registration is required. Otherwise, the signature history storage service provider side apparatus carries out signature verification processing including validity verification of a public key certification for the signer to thereby confirm validity of the signature history at that time point, and then the signature history is stored actually. By applying one of these steps or by applying both steps, the validity of hysteresis signature is verified effectively, even after a long time.

Furthermore, the present invention provides a technique for realizing signature verification vicarious execution service in which verification processing is vicariously executed in response to a request from a signature verification vicarious execution requester who is a user holding a message with a hysteresis signature.

According to one embodiment, the present invention provides a hysteresis signature verification method in which an individual reliability is set to each signature issuing record (referred to as log data) included in a signature issuing history (referred to as log history) used for verification in hysteresis signature verification. The reliability of the signature issuing history is calculated based on the individual reliability. The calculated signature issuing history is generated as the reliability verification result.

According to one embodiment, the present invention provides an arbitration method in which an arbitration result is generated based on a reliability verification result generated according to the above-mentioned hysteresis signature verification method when a dispute occurs between two parties (or between more parties) about authenticity of a signature.

According to another embodiment, the present invention provides a signature history storage service. In the signature history storage service, a signer can deposit log data in a history management apparatus that is a signature history storage service side apparatus every time the log data is issued or periodically or irregularly at the time point after some log data has been issued. The signature history storage service provider who has received a request verifies the validity of the deposited log data (consistency with the deposited log data, and validity of the signature when it is deposited) and stores it by use of the history management apparatus.

Furthermore, according to another embodiment, the present invention provides another signature verification vicarious execution service. In this signature verification vicarious execution service, the signature history storage service provider verifies the validity of a message with a hysteresis signature by use of the signature issuing history of a signer who signed on a message with the hysteresis signature stored in a history management apparatus of the provider in response to a signature verification vicarious execution request from a signature verification vicarious execution requester side apparatus that is used by an owner of the message with the hysteresis signature.

In the present invention, "message" means the digital data on which a digital signature is to be issued.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is a schematic diagram showing a system to which an embodiment of the present invention is applied;

DESCRIPTION OF THE PREFERRED EMBODIMENTS

Figure 2:
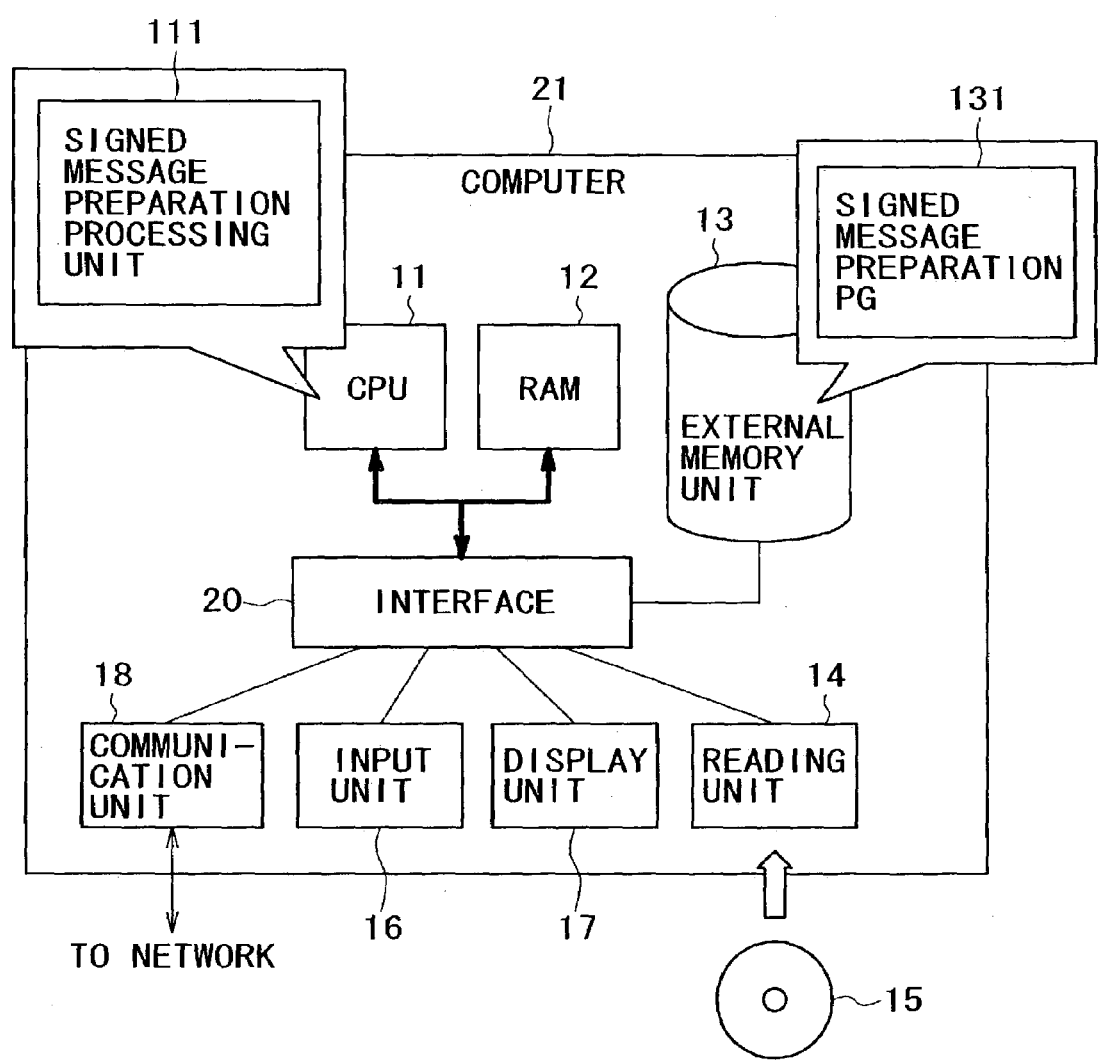
FIG. 2 is a diagram showing a schematic structure comprising a signer apparatus 1, a history management apparatus 2, an arbitration requestor apparatus 3, and an arbitrator apparatus 4.

FIG. 1 is a schematic diagram of a system to which the first embodiment of the present invention is applied.

As shown in the figure, a signer apparatus 1 that is used by a signer who forms a hysteresis signature, a history management apparatus 2 that manages a signature issuing history issued in the signer apparatus 1, an arbitration requester apparatus 3 that is used by an arbitration requester who request arbitration of the validity of a signature that the signer forms, and an arbitrator apparatus 4 that is used for arbitration of validity determination of the signature in response to a request are connected to a network 5. In FIG. 1, one apparatus corresponds to each function-type apparatus, however, plural apparatuses may exist for each function-type apparatus.

Figure 12:
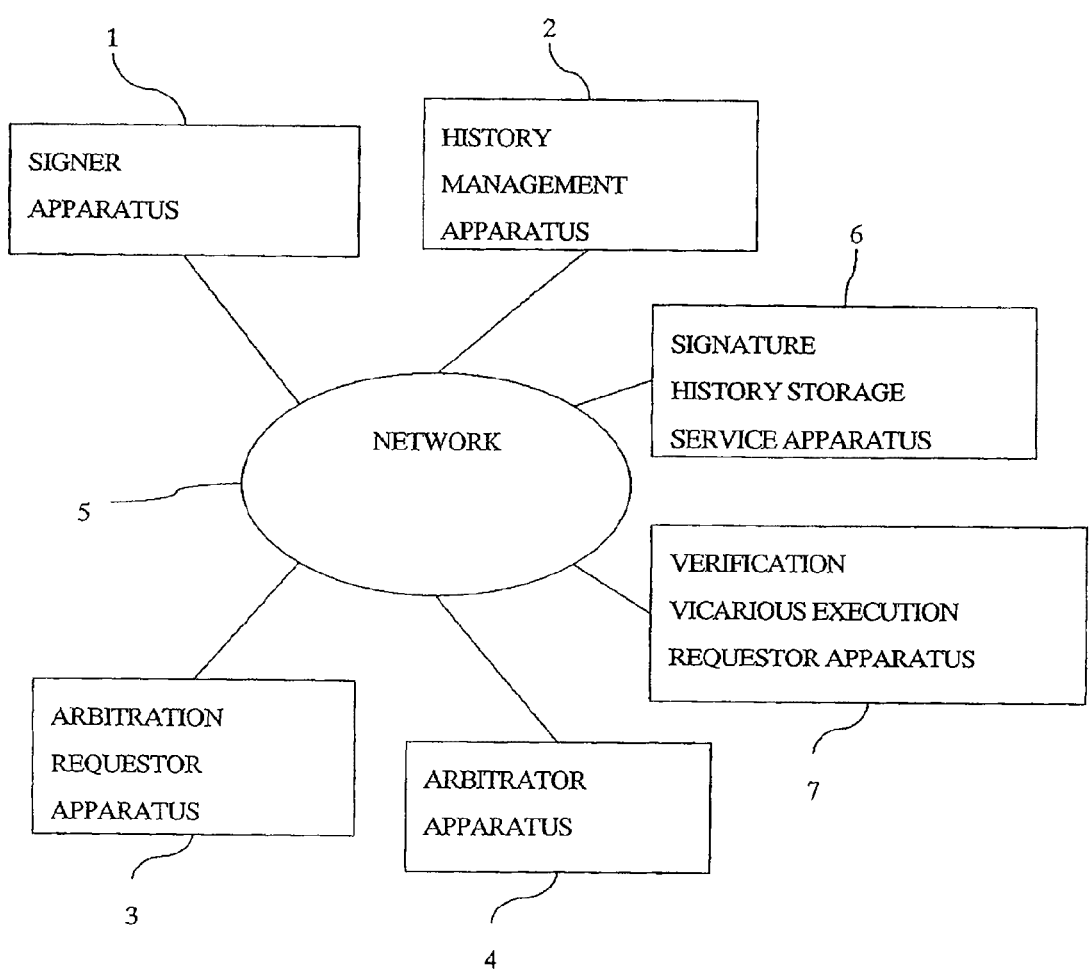
FIG. 12 is a schematic diagram showing a system to which an embodiment of the present invention is applied.

FIG. 12 is a schematic diagram showing a system similar to that of FIG. 1. However, this drawing also shows the signature history storage service apparatus 6 and the verification vicarious execution requester apparatus 7.

FIG. 2 is a schematic structural diagram showing the signer apparatus 1.

The signer apparatus 1 comprises a computer 21 having the general structure provided with a CPU 11, a RAM 12 that functions as the work area of the CPU 11, an external memory unit 13 such as a hard disc unit, a reading unit 14 that reads the data from a movable memory medium 15 such as CD-ROM or FD, an input unit 16 such as a key board or mouse, a display unit 17 such as a display, a communication unit 18 that communicates with other apparatus through the network, and an interface 20 that involves data transmission between the above-mentioned components.

The external memory unit 13 of the signer apparatus 1 contains a signed message issuing PG (program) 131 that forms a digital signature on a message, distributes the message with hysteresis signature having the issued digital signature (hysteresis signature), and requests registration of the signature issuing record to the history management apparatus 2. This program is loaded on the RAM 12 and embodied by the signed message issuing processor 111 of the CPU 11 as a process.

The history management apparatus 2, the arbitration requester apparatus 3, and the arbitrator apparatus 4 have the same structure as the signer apparatus 1.

The external memory unit 13 of the history management apparatus 2 contains a history registration PG (program) 132 that receives signature issuing record that is requested to be recorded from the signer apparatus 1 and registers the signature issuing record as the signature history, and a history transmission PG (program) 133 that transmits the signature history managed by the history management apparatus 2 in response to a request from the signer apparatus 1, the arbitration requester apparatus 3, or the arbitrator apparatus 4. These programs are loaded on the RAM 12, and embodied as a process of a history registration processor 112 and history transmission processor 113 by the CPU 11.

The external memory unit 13 of the arbitration requester apparatus 3 contains a history request PG (program) 134 that requests a signature history of a message with hysteresis signature that is to be an arbitration target to the history management apparatus 2 and receives it, and an arbitration request PG (program) 135 that transmits the signature history of the message with a hysteresis signature that is to be an arbitration target to the arbitrator apparatus 4 for requesting arbitration. These programs are loaded on the RAM 12, and embodied as the process of a history request processor 114 and arbitration request processor 115 by the CPU 11.

The external memory unit 13 of the arbitrator apparatus 4 contains an arbitration PG (program) 136 that receives a message with a hysteresis signature and a signature history of the message from each arbitration requester apparatus 3, and determines a most reliable arbitration requester. These programs are loaded on the RAM 12, and embodied as a process of an arbitration processor 116 by the CPU 11.

Each program may be stored previously in the external memory unit 13, may be loaded from the memory medium 15 through the reading unit 14, or may be downloaded from other apparatuses through the communication unit 18 and a network as required.

The signer apparatus 1, the history management apparatus 2, the arbitration requestor apparatus 3, and the arbitrator apparatus 4 are independent in the present embodiment, but the structure may be different from that of the present embodiment. For example, the function of the signer apparatus 1 and the function of the history management apparatus 2 may be combined to form a single apparatus. In this case, it is not necessary to request signature issuing record registration to the history management apparatus 2 because a signature issuing record of the signer can be managed by signer himself.

Otherwise, the function of the history management apparatus 2 and the function of the arbitrator apparatus 4 may be combined to form a single apparatus. In this case, it is not necessary that an arbitrator gets a signature history of a message with hysteresis signature that is to be an arbitration target from the arbitrator apparatus 4 when the arbitration requester request the arbitration, and the above-mentioned combination is efficient. It is probable that a person is a signer in one situation and the same person is an arbitration requester in another situation because the data is two-way communicated for trading generally. In such a case, the function of the signer apparatus 1 and the function of the arbitration requester apparatus 3 may be combined to form a single apparatus.

If plural signer apparatuses 1 are used in the present embodiment, the history management apparatus 2 may manage the signature issuing record of these plural signer apparatuses 1. An embodiment that involves management of signature issuing histories of plural signer apparatuses 1 as described hereinabove will be described in detail hereinafter in the description of the second embodiment as a signature history storage service apparatus.

Figure 3:
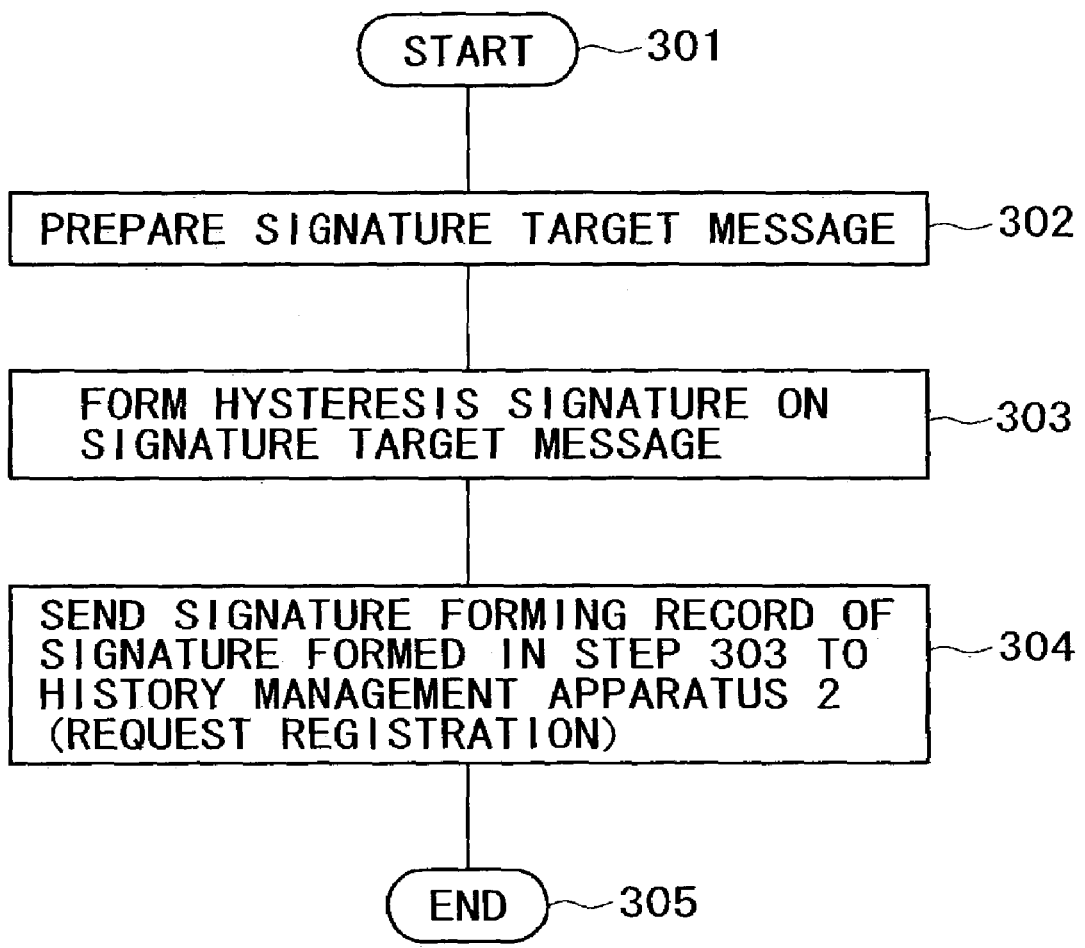
FIG. 3 is a process flow of a signed message preparation PG 131 of the signer apparatus.

FIG. 3 is a process flowchart describing signed message issuing PG 131 of the signer apparatuses 1.

step 301: start step 302: form a signature target message step 303: form a hysteresis signature on a signature target message step 304: send a signature issuing record (log data) of the signature issued in step 303 to the history management apparatus 2 (request registration)

step 305: (as required) send the message with hysteresis signature with a public key certificate to a receiver apparatus step 306: end The receiver apparatus described in step 305 is not shown in FIG. 1. For example, if the signature target message is a trade agreement, an apparatus of a trade partner who receives the agreement corresponds to the receiver apparatus in step 305. The schematic structure of the receiver apparatus may be the same as that shown in FIG. 2. Furthermore, the arbitration requester is the receiver, and the arbitration requester apparatus and the receiver apparatus may be the same.

Issuing of a hysteresis signature in step 303 may be realized according to a procedure of "hysteresis signature issuing process" shown hereunder in detail. In the description, the following notation will be employed. A signer is assumed to be Alice.

"Notation"

Signature_K( ): signature issuing process in conventional electronic signature method (for example, RSA signature, DSA signature, E.CDSA signature) by use of a signature issuing key K.

Verify_K( ): signature inspection process in conventional electronic signature method by use of a signature inspection key K.

h( ): one-way hash function (for example, SHA-1 hash function, MD5 hash function)

A||B: data issued by combining two data pieces A and B.

Ks: signature issuing key of Alice.

Kv: signature inspection key of Alice.

n: number of times of hysteresis signature issuing by Alice.

IV: initial value.

Mn: n-th signature target message.

Sn: n-th message with hysteresis message.

Rn: n-th hysteresis signature issuing record.

Hn: data issued by combining signature issuing histories (first to n-th hysteresis signature issuing records) after n-th hysteresis signature is issued.

"Hysteresis Signature Issuing Process"

step 3031: (signature issuing phase) calculate hash value h (Mn) of signature target message Mn.

step 3032: calculate hash value h (Rn−1) of the newest signature issuing record Rn−1 included in stored signature issuing history Hn−1. Use the initial value IV instead of hash value h (Rn−1) according to the following procedure in the first hysteresis signature issuing process.

step 3033: conventional signature is issued on the data h(Mn)||h(Rn−1) issued by combining two hash values calculated in steps 3031 and 3032 by use of a signature issuing key Ks to form a message with electronic signature Sgn_Ks(h(Mn)||h(Rn−1).

step 3034: combine signature target message Mn, hash value h (Rn−1) of the newest signature issuing record, and the message with electronic signature Sign_Ks(h(Mn)||h(Rn−1) to form a message with a hysteresis signature Sn=Mn||h(Rn−1)||Sign_Ks(h(Mn)||h(Rn−1)).

step 3035: (signature issuing history update phase) combine two hash values h(Mn), h(Rn−1) and the message with an electronic signature Sign_Ks(h(Mn)||h(Rn−1)) to form a signature issuing record Rn=h(Mn)||h(Rn−1)||Sign_Ks(h(Mn)||h(Rn−1)).

step 3036: combine the stored signature issuing history Hn−1 and signature issuing record Rn to form and store a signature issuing history Hn=Hn−1||Rn.

The hash value h (Mn) of the signature target message Mn is calculated in the above-mentioned step 3031, but the signature target message Mn may be used as it is instead of the hash value in the following steps if the signature issuing process Sign_K( ) allows it. As an example in which the signature issuing process Sign_K( ) allows the signature target message Mn to be used, a method has been known in which the data of an arbitrary length is allowed by applying signature issuing process Sign_K( ) repeatedly so as to match with the input data length. In the above-mentioned hysteresis signature issuing method, the number n of times of hysteresis signature issuing by Alice, namely an index for indicating the position number of a signature issuing record in the arrangement of signature issuing records, is not included clearly in the signature issuing record.

However, the above-mentioned index may be included by applying a method described hereunder. For example, h(Mn)||h(Rn−1)||n is used instead of h(Mn)||h(Rn−1) as the signature target message in step 3033, Sn=Mn||h(Rn−1)||Sign_Ks(h(Mn)||h(Rn−1)||n)||n is used instead of Sn=Mn||h(Rn−1)||Sign_Ks(h(Mn)||h(Rn−1) as the message with hysteresis signature in step 3034, and Rn=h(Mn)||h(Rn−1)||Sign_Ks(h(Mn)||h(Rn−1)||n)||n is used instead of Rn=h(Mn)||h(Rn−1)||Sign_Ks(h(Mn)||h(Rn−1) as the signature issuing record. The above-mentioned process allows a necessary signature issuing record to be searched easily from the signature issuing history in the signature verification process.

Figure 4:
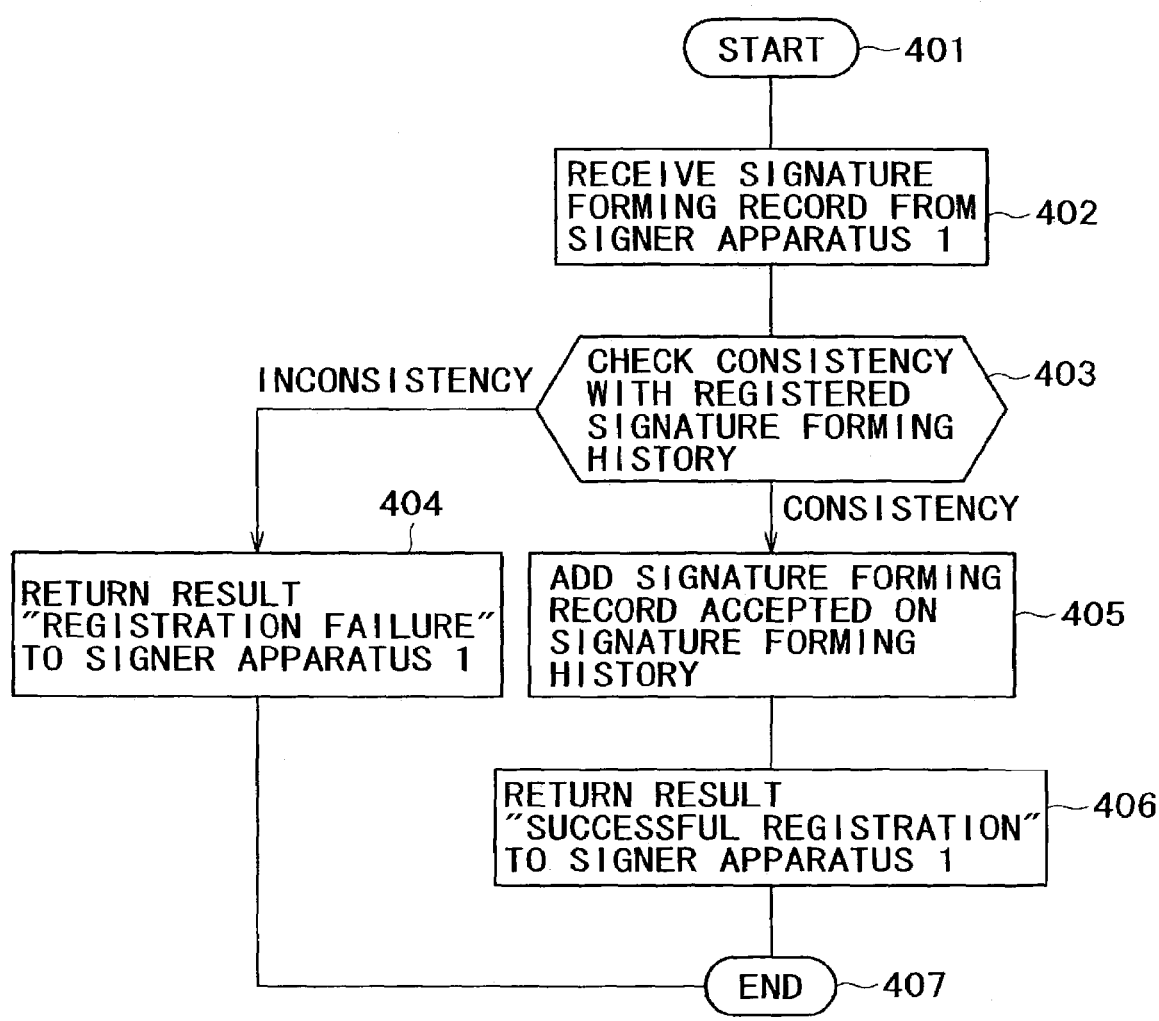
FIG. 4 is a process flow of a history registration PG 132 of the history management apparatus.

FIG. 4 is a process flow of history registration PG 132 of the history management apparatus 2.

step 401: start.

step 402: receive a signature issuing record from the signer apparatus 1 (accept registration request). (signer is assumed to be Alice).

step 403: check consistency with a signature issuing history (log list) of Alice that has already been registered, and proceed to step 405 if a consistency result is obtained. Otherwise, the sequence proceeds to step 404.

step 404: return a result "registration failure" to the signer apparatus 1, and the sequence proceeds to the end.

step 405: add the signature issuing record accepted in step 402 to the signature issuing history of Alice.

step 406: return a result "successful registration" to the signer apparatus 1.

step 407: the sequence proceeds to the end.

The consistency in step 403 is checked in detail as described hereunder. The signature issuing record received in step 402 is denoted by Hn, and the signature issuing history of Alice that has already been registered at the time point of step 403 is denoted by Hn−1.

A hash value h(Hn−1) of the newest signature issuing record Hn−1 among the signature issuing history is calculated at first. Next, whether or not the calculated hash value h(Hn−1) is identical with the hash value h(Hn−1) in the signature issuing record Hn that has been received in step 402 is confirmed. The calculated hash value h(Hn−1) is determined to be consistent if a consistency result is obtained, and otherwise, the calculated hash value h(Hn−1) is determined to be inconsistent.

Figure 5:
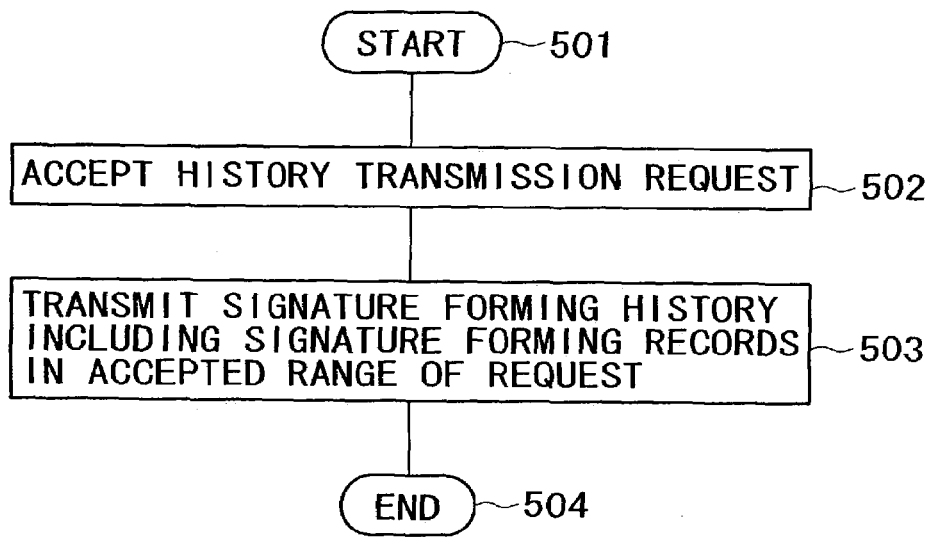
FIG. 5 is a process flow of a history transmission PG 133 of the history management apparatus.

FIG. 5 shows a process flow of the history transmission PG 133 of the history management apparatus 2.

step 501: start.

step 502: accept a history transmission request (signer name and requested history range (from what position number to what position number) are included).

step 503: transmit a signature issuing history including signature issuing records in the accepted range of the request.

step 504: end.

Figure 6:
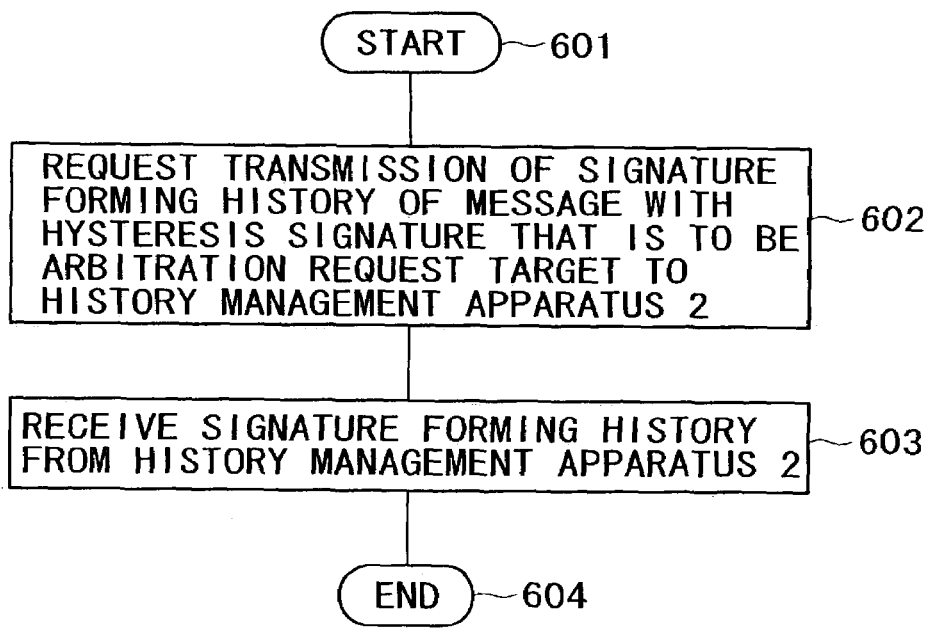
FIG. 6 is a process flow of a history request PG 134 of the arbitration requestor apparatus.

FIG. 6 shows a process flow of the history request PG 134 of the arbitration requester apparatus 3.

step 601: start.

step 602: request transmission of a signature issuing history of a message with hysteresis signature that is to be an arbitration request target to the history management apparatus 2. (transmit a signer name of the hysteresis signature and request range (for example, the signature issuing history including all the signature issuing records from the signature issuing record of the hysteresis signature to the newest signature issuing record at that time point)).

step 603: receive the signature issuing history from the history management apparatus 2.

step 604: end.

Figure 7:
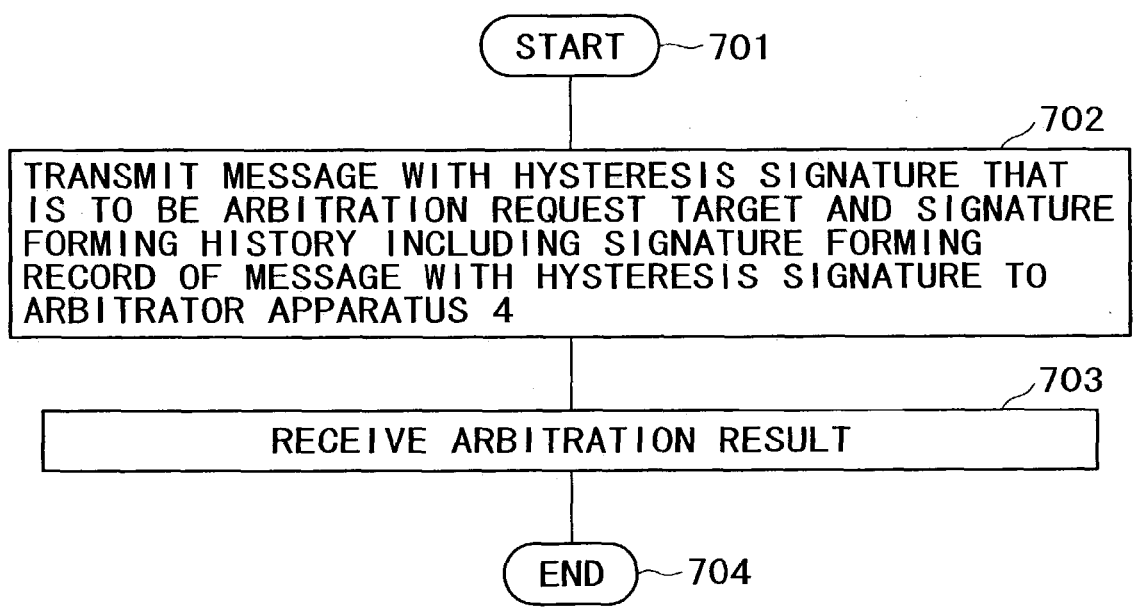
FIG. 7 is a process flow of an arbitration request PG 135 of the arbitration requester apparatus.

FIG. 7 shows a process flow of the arbitration request PG 135 of the arbitration requester apparatus 3.

step 701: start.

step 702: transmit the message with a hysteresis signature that is to be the arbitration request target and the signature issuing history including the signature issuing record of the message with a hysteresis signature acquired from the history management apparatus 2 to the arbitrator apparatus 4 to thereby request arbitration.

step 703: receive an arbitration result.

step 704: end.

Figure 8:
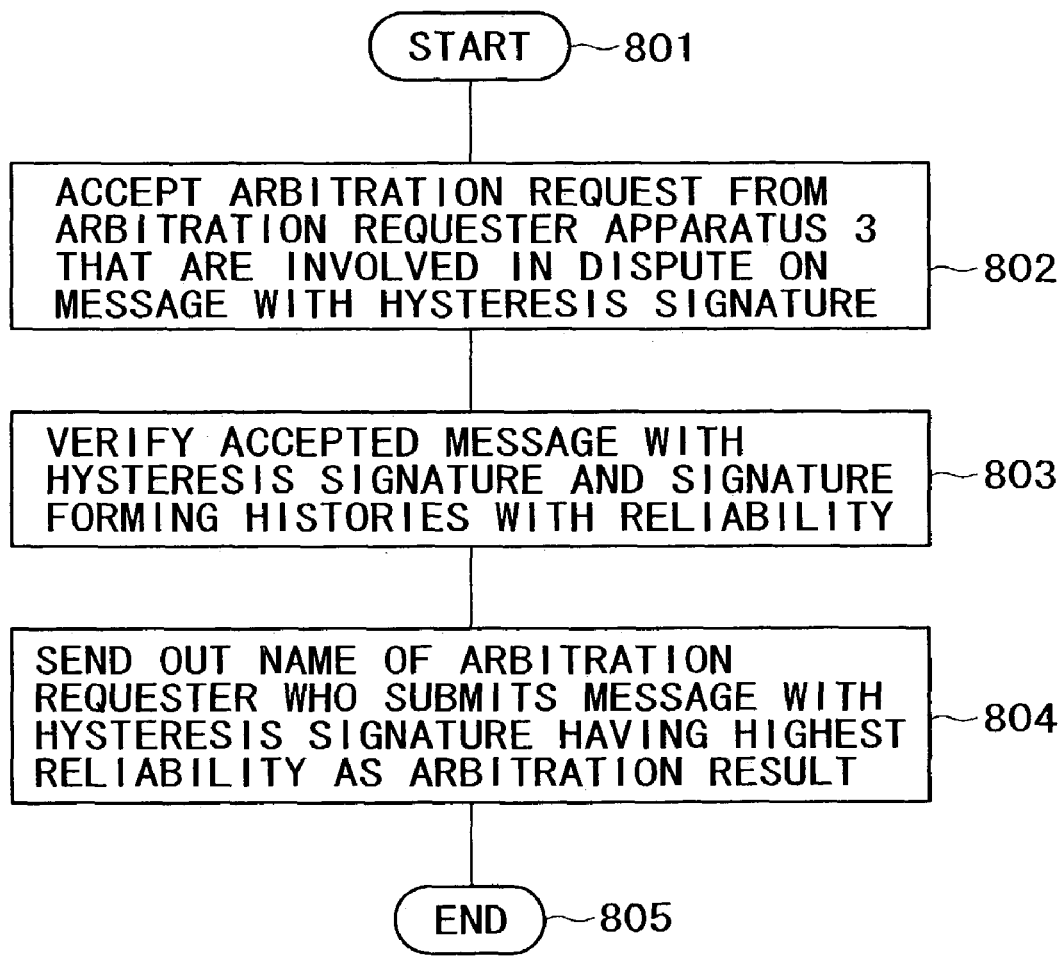
FIG. 8 is a process flow of an arbitration PG 136 of the arbitrator apparatus.

FIG. 8 shows a process flow of the arbitration PG 136 of the arbitrator apparatus 4.

step 801: start.

step 802: accept arbitration request from arbitration requester apparatus 3 (plural in general) that are used by arbitration requesters who are involved in a dispute on the message with a hysteresis signature.

step 803: verify messages with a hysteresis signature and signature issuing histories accepted from respective arbitration requester apparatuses 3 with reliability.

step 804: send out the name of the arbitration requester who submits the message with a hysteresis signature having the highest reliability as the arbitration result. (transmit to plural related arbitration requester apparatuses 3).

step 805: end.

The verification process in the above-mentioned step 803 is realized according to "hysteresis signature verification process" as described in detail hereunder.

"Hysteresis Signature Verification Process"

At first, a message with hysteresis signature Sn is verified as described hereunder.

step 8031: calculate a hash value h(Mn) of a signature target message Mn included in a message with hysteresis signature Sn.

step 8032: carry out conventional signature verification process by use of the hash value h(Mn) calculated in step 8031, a hash value h(Rn−1) included in the message with hysteresis signature Sn, a message with electronic signature Sign_Ks(h(Mn)‖h(Rn−1), and a signature inspection key Kv included in the public key certification of Alice. If it cannot be verified, the sequence proceeds to the end as the verification failure.

step 8033: confirm inclusion of a signature issuing record Rm=h(Mm)‖h(Rm−1)‖Sign_Ks(h(Mn)‖h(Rm−1)), that corresponds to the message with hysteresis signature that is the verification target, in the signature issuing history Hn of Alice. If it cannot be confirmed, the sequence proceeds to the end as verification failure.

step 8034: verify consistency of the signature issuing history Hn as described hereunder on the assumption k=m.

calculate a hash value h(Rk−1) of the signature issuing record Rk−1 included in the signature issuing history Hn.

confirm identity of the hash value h(Rk−1) in the signature issuing record Rk with h(Rk−1) that is calculated hereinabove. If identity is not confirmed, the sequence proceeds to step 8035.

if k<n, then k:=k+1, and the sequence proceeds to (i). Otherwise, the sequence proceeds to step 8035.

step 8035: set the reliability on respective signature issuing records Rm, . . . , Rk that are confirmed to be consistent among signature issuing history Hn.

step 8036: calculate the reliability of the signature issuing record Rm corresponding to the signature to be verified based on the reliability of each signature issuing record set in step 8035, and send out this result as the reliability of verification result ("successful verification").

An individual reliability described hereunder may be used as the reliability of the signature issuing record that is set in step 8035.

The individual reliability of the signature issuing record Ri means a value f_rely(Ri)=(pind(Ri), qind(Ri), tind(Ri)) that is determined by means of the inspection procedure of Ri. pind(Ri), qind(Ri), tind(Ri) are defined as described hereunder independently of other signature issuing records.

pind(Ri): the probability of "correct" to be determined by means of the inspection procedure if Ri is correct. (1/2<pind(Ri)<=1).

qind(Ri): the probability of "correct" to be determined by means of the inspection procedure if Ri is forgery. (0<=qind(Ri)<=1/2).

tind(Ri): the determination result of Ri obtained by means of the inspection procedure (tind(Ri)=1 if Ri is determined to be "correct", and tind(Ri)=0 if Ri is determined to be "forgery").

The individual reliability is set to be f_rely(Ri)=(1/2, 1/2, 1) if a signature issuing record Ri cannot be inspected for the reason that there is no base for determination.

Furthermore, for example, the reliability of signature issuing history described hereunder may be used as the reliability of the signature issuing record Rm that corresponds to the signature to be verified calculated in step 8036.

The reliability of the signature issuing record Rm of the signature issuing history Hn is the probability that Rm is actually correct f_post_rely(Rm). The following proposition holds for f_post_rely(Rm).

(Proposition 1)
Equation 1 holds as described hereunder.

$$f\_post\_rely(Rm) <= \Pi\_\{i=m,,,k\} \, Pind(Ri)/(\Pi\_\{i=m,,,k\} \, Pind(Ri) + \Pi\_\{i=m,,,k\} \, Qind(Ri)) \quad \text{(equation 1)}$$

(Note for the equation 1. $\Pi\_\{i=m,,,k\} \, Xi$ represents the total number including from Xm to Xk. That is, $\Pi\_\{i=m,,,k\} \, Xi = Xm \times \ldots \times Xk$.

Pind(Ri)=pind(Ri) if tind(Ri)=1,
Pind(Ri)=1−pind(Ri) if tind(Ri)=0,
Qind(Ri)=qind(Ri) if tind(Ri)=1, and
Qind(Ri)=1−quid(Ri) if tind(Ri)=0)

(Outline of Proof)

It is assumed that the signature issuing record Ri links to the Ri+1, and both signature issuing records Ri and Ri+1 are determined to be correct by means of respective suitable inspection means. Therefore, f_rely(Ri)=(pind(Ri), qind(Ri), 1) (j=i, i+1). The probability that Ri+1 is actually correct is written as f_post_rely(Ri+1), then $$f\_post\_rely(R+1) = pind(Ri+1)/(pind(Ri+1)+qind(Ri+1))$$

is obtained if there is no other condition.

On the other hand, the probability that Ri is actually correct is considered hereunder. Ri links(to Ri+1, and the probability that Ri+1 is actually correct is known. The prior probability that Ri is actually correct f_pri_rely(Ri) satisfies f_pri_rely(Ri)>=f_post_rely(Ri+1) based on one-way characteristic of hash function. Therefore, the probability that Ri is actually correct f_post_rely(Ri) is $$f\_post\_rely(Ri) = f\_pri\_rely(Ri)pind(Ri)/(f\_pri\_rely(Ri)pind(Ri)+(1-f\_pri\_rely(Ri))qind(Ri)) >= f\_post\_rely(Ri+1)pind(Ri)/(f\_post\_rely(Ri+1)pind(Ri)+(1-f\_post\_rely(Ri+1))qind(Ri)) = pind(Ri+1)pind(Ri)/(pind(Ri+1)pind(Ri)+qind(Ri+1)qind(Ri))$$

The above may be repeated. (end of proof)

Based on the proposition 1, it is understandable that the reliability of the signature issuing record Rm is evaluated from the bottom with the right-hand value of the above (equation 1) Therefore, for example, the reliability of the signature issuing record Rm corresponding to the signature to be verified that is calculated in step 8036 is considered to be equal to the right-hand value of the above (equation 1), then the verification result of the signature is evaluated properly.

According to the verification method of hysteresis signature with reliability, a verification method for determining the reliability of the signature history properly is realized. Furthermore, the verification method provides an arbitration method and arbitrator apparatus that are used to solve the dispute on a message with a hysteresis signature by determining based on the above-mentioned verification method.

Next, the second embodiment in which the present invention is applied to a signature history service will be described.

FIG. 1 is a schematic diagram showing a system employed in the present embodiment. In the present embodiment, the history management apparatus 2 is realized on the same apparatus as each signer apparatus 1. In addition to the history management apparatus 2, a signature history storage service apparatus 6 that accepts a history registration request from plural signer apparatus 1 to store and manage the signature history and a verification vicarious execution requester apparatus 7 that requests signature verification vicarious execution of a message with a hysteresis signature that is transmitted from a signer apparatus 1 to the signature history storage service apparatus 6, both are not described in the first embodiment, are connected to the network 5. The arbitration requester apparatus 3 and the arbitrator apparatus 4 are not described in the present embodiment, but an arbitrator apparatus may be provided as in the first embodiment.

Figure 9:
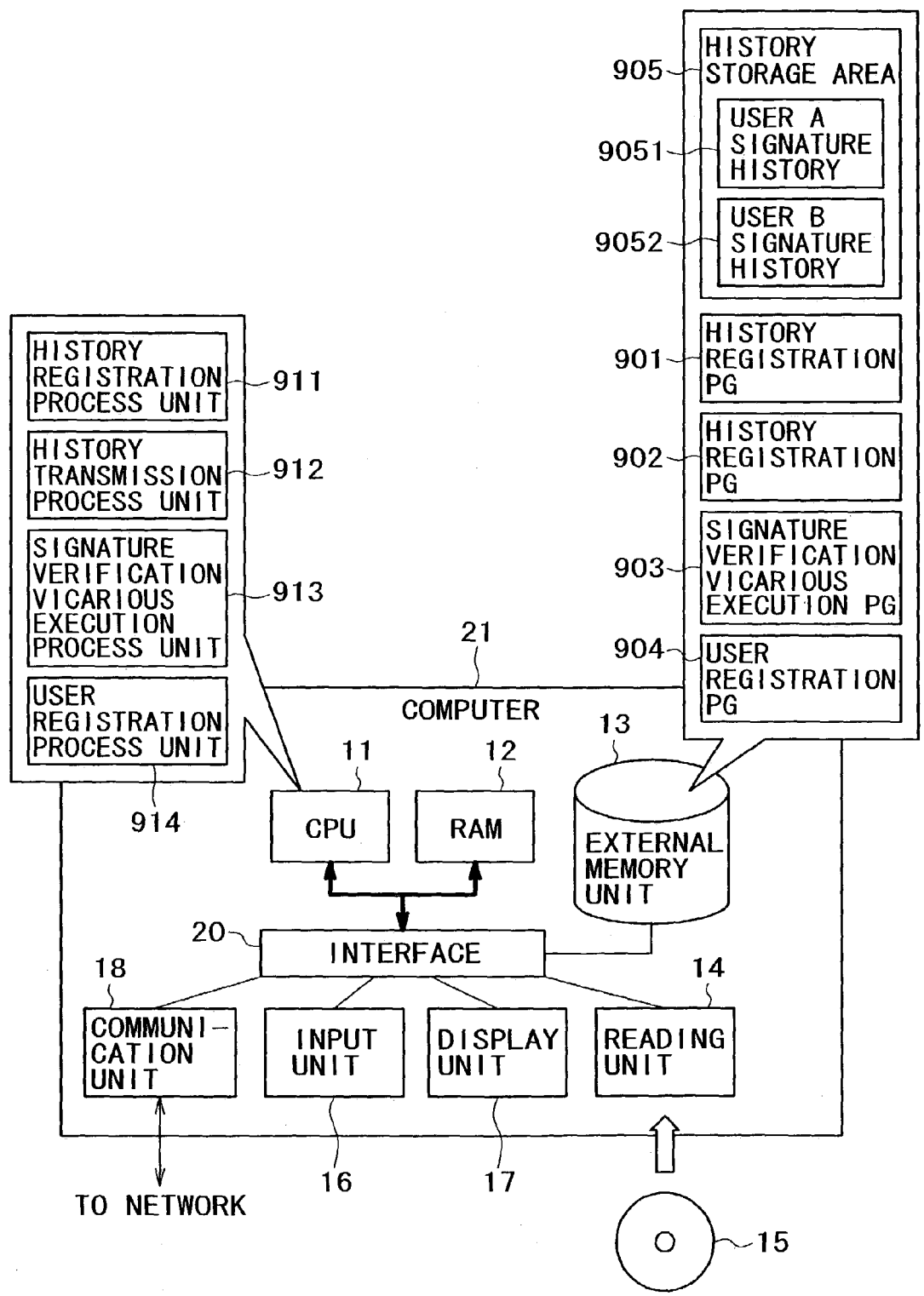
FIG. 9 is a diagram showing a schematic structure of a signature history storage service apparatus 6.

FIG. 9 is a diagram showing the structure of the signature history storage service apparatus 6 used in the present embodiment. The same basic structure as that of the history management apparatus 2 used in the first embodiment is employed.

The signature history storage service apparatus 6 is provided with an external memory unit 13 containing a history registration program (referred to as program PG hereinafter) 901 that receives a signature issuing record (referred to as log data) requested from a signer apparatus 1 to register and registers the signature issuing record as a signature issuing history (referred to as log list), a history transmission PG 902 that transmits a signature history managed by the signature history storage service apparatus 6 in response to the request from the signer apparatus 1, a signature verification vicarious execution PG 903 that vicariously executes a signature verification process in response to the request from a signature verification vicarious execution requester holding a message with a hysteresis signature, and a user registration PG 904 that registers users who use the signature management apparatus. The history transmission PG 902 is basically the same as the history transmission PG 133 used in the first embodiment. The history registration PG 901 and the signature verification vicarious execution PG 903 will be described in detail hereinafter. The above-mentioned programs are loaded on the RAM 12, and the CPU 11 executes these programs to thereby realize processes such as a history registration process unit 911, a history transmission process unit 912, a signature verification vicarious execution process unit 913, and a user registration process unit 914. The external memory unit 13 is provided with a history storage area 905 for storing the signature issuing record requested to register on which a signature history (for example, user A signature history 9051, user B signature history 9052) is stored for each signer.

The signer apparatus 1 of the present invention has basically almost the same structure as the structure of the signer apparatus 1 of the first embodiment, but the history registration request PG 137 is added as the program stored in the external memory unit 13.

The verification vicarious execution requester apparatus 7 has the same structure as that of the signer apparatus 1. The external memory unit 13 contains a signature verification request PG 906 that requests verification of a message with hysteresis signature held in this apparatus 7 to the signature history storage service apparatus 6.

Programs provided in the signature history storage service apparatus 6 and the verification vicarious execution requester apparatus 7 may be stored previously in the external memory unit 13, or may be loaded from a memory medium 15 through a reading unit 14 or from other apparatuses through a communication unit 18 and communication medium (namely network 5 or carrier wave for transmitting it) as required.

Figure 10:
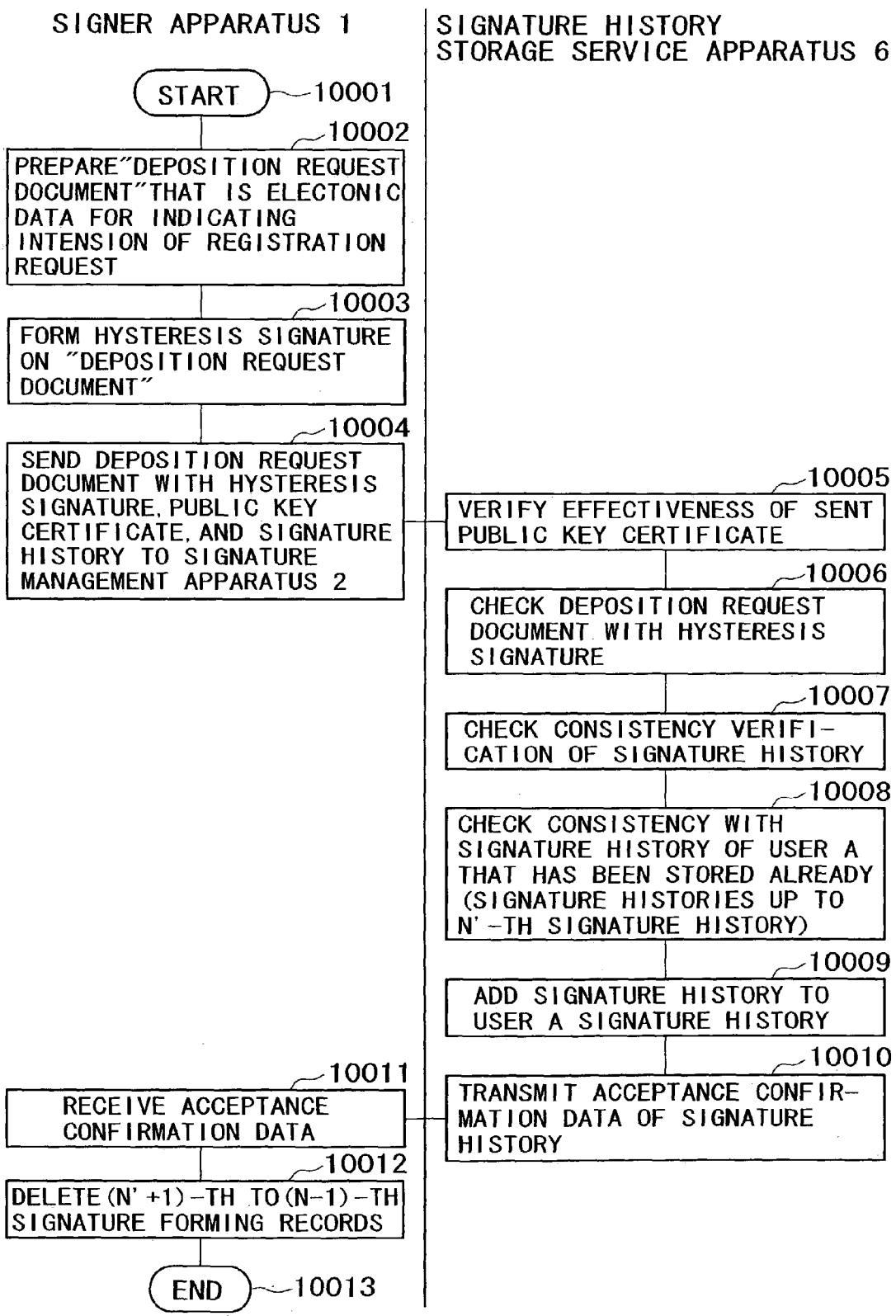
FIG. 10 is a flow carried out when the signer apparatus 1 requests history registration to the signature history storage service apparatus 6 in the second embodiment.

FIG. 10 is a diagram showing a process flow that is operated when the signer apparatus 1 requests history registration to the signature history storage service apparatus 6 that provides history storage service in the present embodiment. In the flow described hereinafter, the process of the signer apparatus 1 of user A is realized by executing the history registration request PG 137, and the process of the signature history storage service apparatus 6 is realized by executing the history registration PG 901. The signer who requests history registration is assumed to be user A hereinafter.

(Process of Signer Apparatus 1 of User A)

step 10001: start.

step 10002: prepare "deposition request document" that is the electronic data for indicating the intention of registration request.

The deposition request document includes the electronic data for indicating the intention of registration request, and may additionally include time information, user name, information for identifying the signer apparatus 1, information for indicating connection of the signer apparatus 1 to the network (for example, IP address), and information for indicating the number of signature issuing records that is to be the registration request target and the position number of signature issuing record.

step 10003: form a hysteresis signature on "deposition request document". (note: the newest signature record at that time point, namely the signature record corresponding to the signature on the "deposition request document" issued in this step, is assumed to be an n-th signature record. Furthermore, the signature record corresponding to "deposition request document" issued in the last history registration request is assumed to be n'(<n)-th signature record.)

step 10004: send the deposition request document with hysteresis signature, public key certificate corresponding to the signature issuing key of the deposition request document, and signature history including from (n'+1) signature issuing record to the n-th signature issuing record to the signature management apparatus 2.

(Process of Signature History Storage Service Apparatus 6)

step 10005: verify the validity of the sent public key certificate. (whether an effective CA (approval station) signature is given or not, whether the time is within the term of validity or not, whether the public key certificate is rendered invalid or not by CA (approval station))

step 10006: check whether or not the sent deposition request document with hysteresis signature is verified correctly with the public key of user A included in the public key certificate. (Check whether the verification process shown in step 8032 is carried out correctly or not).

step 10007: check the consistency verification of the sent signature history. (Carry out the process of step 8034 under the condition of m=n'+1).

step 10008: check the consistency with the signature history of user A that has been stored already (signature histories up to an n'-th signature history). (Calculate a hash value h(Rn') of the signature issuing record Rn', and confirm that the hash value h(Rn') in the signature issuing record Rn'+1 is identical with the calculated h(Rn')).

step 10009: add the sent signature history to the user A signature history 9051 if the check result in steps 10005 to 10008 is YES.

step 10010: accept the signature history ((n'+1)-th to n-th signature issuing records) from user A, confirm the consistency, and transmit the acceptance confirmation data, indicating addition to the signature history 9051.

(Process of Signer Apparatus 1 of User A)

step 10011: receive the acceptance confirmation data.

step 10012: delete (n'+1)-th to (n−1)-th signature issuing records.

step 10013: end.

The above-mentioned step 10012 may not be executed. The memory area of the signer apparatus 1 of user A is saved if the step 10012 is executed to delete the signature issuing records partially whether the deletion is executed or not may be selected depending on the memory capacity of the signer apparatus 1 of user A.

The history storage service provider stores the history instead of a signer according to the above-mentioned process, and the load of signature history storage on the signer is reduced (step 10012).

The reason why an n-th signature issuing record is not deleted in step 10012 is that the n-th signature issuing record is necessary when the next signature ((n+1)-th signature) is issued.

Furthermore, the history storage service provider, that is a third party organization, confirms the consistency of the chain structure of the signature history (steps 10007 and 10008) and confirms the validity of the newest signature on "deposition request document" and corresponding public key certificate (steps 10005 and 10006). As the result, a signature that is issued by use of the same key as that of the signature on the deposition request document among signatures corresponding to the signature history requested to be registered is guaranteed as a signature that is issued within the term of validity of the public key certificate.

"Deposition request document" is prepared (step 10002), a hysteresis signature is given (step 10003), and the deposition request document with hysteresis signature is transmitted (step 10004) in the above-mentioned flow, but these three steps may be omitted. In this case, signature verification in step 10006 is carried out not on the deposition request document with hysteresis signature but on the newest signature record in the sent signature history. The signature target message itself corresponding to the signature record is not included in the signature record, but the hash value is included in the signature record. Therefore, the process of step 10006 is carried out by use of the hash value.

The frequency of signature history registration request may be set properly depending on the memory capacity of the signer apparatus 1 and signature management apparatus 2 and on the communication quality condition that is secured for the network between both apparatuses. Generally the higher the frequency of registration request is, the less memory capacity of the external memory unit 13 of the signer apparatus 1 is required. The higher frequency of registration request is desirable also in order to improve the reliability of signature history. A signature that is issued by use of the same key as that of the signature on the deposition request document is guaranteed as a signature that is issued within the term of validity of the public key certificate according to the present embodiment. In view of this point, the frequency of a signature history registration request is desirably the same as that or higher than that of public key certificate update. However, the higher registration request frequency requires more frequent communication between the signer apparatus 1 and the signature history storage service apparatus 6.

As an exemplary detailed signature history registration request frequency, a method in which history registration is requested every time when a hysteresis signature is issued may be employed. Furthermore the deposition request document may be omitted. In the case in which history registration is requested every time when a hysteresis signature is issued and the deposition request document is omitted, the only one signature history required to be managed by the signer apparatus 1, namely the newest signature history, is sufficient. Therefore it is possible to save the memory capacity and to mitigate the management load of the apparatus. Furthermore, the signature history corresponding to the signature issued by a signer is also stored in the signature history storage service apparatus 6 always advantageously.

The system may be structured so that an n-th signature issuing record required when a hysteresis signature is issued or hash value of the signature issuing record is acquired from the signature storage service apparatus 6 through the network 5 as required. In the above, management of the signature history in the signer apparatus 1 is made needless. Otherwise, the system may be structured so that the above-mentioned function for acquiring from the signature history storage service apparatus 6 through the network 5 and also the signature management function of the signer apparatus 1 are both provided. In this case, the signature history managed by the signer apparatus 1 is compared with the signature history acquired from the signature history storage service apparatus 6 to check any injustice such as alteration of the signature history by the signature history storage service apparatus 6.

The signature history storage service apparatus 6 transmits the n-th signature issuing, record together with information depending on the signature history of other signers to thereby realize the process in which signature histories of plural signers are crossed as disclosed in Japanese Published Unexamined Patent Application No. 2001-331105. The term "cross" means that the signature history information of a signer is reflected on the signature history of another signer.

The crossing of the signature history of a signer with the signature history of another signer means that the sure evidence of the signing is held dispersedly. Therefore, increased work is required to forge the signature or to alter the time information of the signing, and plural signers or plural signer apparatus are required to be involved in injustice. As the result, the crossing is effective to suppress the injustice.

Figure 11:
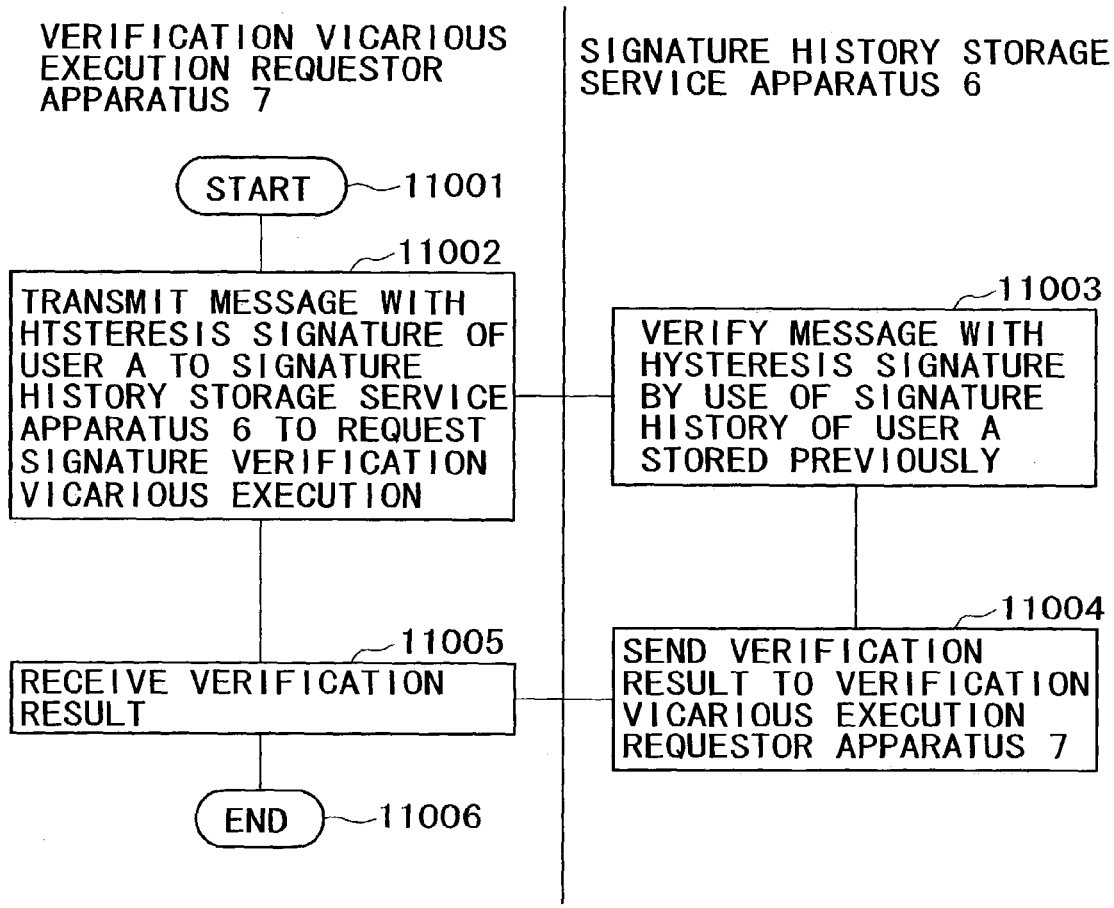
FIG. 11 is a flow carried out when a verification vicarious execution requester apparatus 7 requests signature verification vicarious execution to the signature history storage service apparatus 6 in the second embodiment.

FIG. 11 is a flow of the present embodiment that is carried out when the verification vicarious execution requester apparatus 7 used by a signature verification vicarious execution requester who holds a message with a hysteresis signature received from the signer apparatus 1 requests signature verification vicarious execution to the signature history storage service apparatus 6. In the flow described hereunder, the process of the verification vicarious execution requester apparatus 7 is realized by means of the signature verification request PG 906, and the process of the signature history storage service apparatus 6 is realized by means of the signature verification vicarious execution PG 903. A signer who forms a signature to be verified is assumed to be user A in the following description.

(Process of Signature Verification Request PG 906)
step 11001: start.
step 11002: transmit a message with hysteresis signature of user A to the signature history storage service apparatus 6 to request signature verification vicarious execution.
(Process of Signature Verification Vicarious Execution PG 903)
step 11003: verify the message with hysteresis signature that has been requested for verification vicarious execution by use of the signature history of user A stored previously.
step 11004: send the verification result to the verification vicarious execution requester apparatus 7.
(Process of Signature Verification Request PG 906)
step 11005: receive the verification result.
step 11006: end.

Verification of a message with hysteresis signature in the process of step 11003 may be carried out in the same manner as described in "Hysteresis Signature Verification Process" described in the first embodiment. If the signature history storage service apparatus 6 is reliable, setting of the reliability in steps 8035, and 8036 is omitted, and the result is regarded to be reliable.

Furthermore, in realization of the function to cross signature histories of plural signers in the signature history storage service apparatus 6 as disclosed in Japanese Published Unexamined Patent Application No. 2001-331105, the correctness of signature history crossing may also be verified.

The embodiment in which the signature verification vicarious execution process is realized on the same apparatus as the signature history storage service apparatus 6 for executing history registration process is described exemplarily, but the signature verification vicarious execution process may be realized on a separate apparatus that links to the signature history storage service apparatus 6.

The signature issuing function is provided in the signer apparatus 1 managed by each signer in the first embodiment of the present invention described hereinabove, but the present invention is by no means limited to this embodiment. For example, the signature issuing function for each signer is separated from the signer apparatus 1 and provided in the signature history storage service apparatus 6. A function to request hysteresis signature issuing to the signature history storage service apparatus 6 and to receive a issued signature may be provided instead to each signer apparatus 1. In this case, it is desirable that a process for authenticating a signer based on a password or biometric authentication technique in accepting hysteresis signature request is provided in the signature history storage service apparatus 6. The signature issuing function provided in the signature history storage service apparatus 6 as the third party organization allows a signer to form a signature of the signer by use of various signer apparatus. For example, a signer who has plural systems such as PC (Personal Computer), cellular phone, and PDA can form a signature of the signer by use of any one of the systems.

The second embodiment described hereinbefore provides signature history storage service for storing a signature history issued by a signer reliably for a long time vicariously for the signer. Furthermore, the second embodiment provides signature verification vicarious execution service for vicariously executing signature verification process in which the signature history is used.

Each apparatus of the second embodiment is provided with functions of other apparatuses combinedly, and may function as a different apparatus as required.

Programs of respective apparatuses in the first and second embodiments may be stored previously in external memory units, or may be installed from a memory medium through a reading unit or may be downloaded from other apparatuses through a communication unit and communication medium (namely network or carrier wave for transmission) as required.

According to the present invention, the invention provides a method for verification in which the reliability of a signature history is reflected properly on the verification. Furthermore, the invention provides a method for arbitration and an arbitrator apparatus for solving dispute on correctness of the signature based on the method for verification.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method for managing a log list, which is an issuing history of a digital signature issued on a message by a digital signature issue side apparatus, in a signature history storage service apparatus comprising:

accepting the log list from the digital signature issue side apparatus, verifying validity of the digital signature of a digital signer signed on the log list or log list registration request data, verifying consistency between the accepted log list and a registered log list of a registered digital signer, adding and registering the accepted log list with the confirmed consistency to the registered log list of the digital signer, and registering a user of the signature history storage service apparatus who is a digital signer of the digital signature issue side apparatus.

2. The method for managing a log list according to claim 1, further comprising:

confirming the consistency is confirmed, and transmitting a fact that the accepted log list is added and registered to the registered log list of the digital signer, to a digital signer side apparatus.

3. The method for managing a log list according to claim 1 comprising:

a step in which the digital signature issue side apparatus requests registration of the accepted log list to the signature history storage service apparatus, and a step in which log data other than the newest log data included in the accepted log list is deleted if the additional registration notice is received.

4. The method for managing a log list according to claim 3, wherein the digital signature issue side apparatus performs:

a step comprising issuing electronic data of a deposition request document for indicating intention of a registration request, and a step comprising transmitting the issued deposition request document electronic data, a public key certificate, and log list data, to the signature history storage service apparatus and as the step for verifying the validity of the digital signature, the signature history storage service apparatus performs:

a step comprising verifying the validity of the received public key certificate, and a step comprising checking whether or not the deposition request document is verified correctly by use of a public key of a user included in the public key certificate.

5. The method for managing a log list according to claim 3, wherein the digital signature issue side apparatus requests registration of the log list every time when a digital signature is issued.

6. The method of claim 1 for managing a log list, which is an issuing history of a digital signature issued on a message by a digital signature issue side apparatus, in a signature history storage service apparatus, further comprising:

sending an additional registration notice to the digital signature issue side apparatus after registering the accepted log list to the registered log list, and deleting in the digital signature issue side apparatus log data other than the newest log data of the digital signer included in the accepted log list when the digital signature issue side apparatus receives the additional registration notice sent from the signature history storage service apparatus.

7. The method for managing a log list according to claim 6, wherein the digital signature issue side apparatus performs:

a step comprising issuing electronic data of a deposition request document for indicating intention of a registration request, and a step comprising transmitting the issued deposition request document electronic data, a public key certificate, and log list data, to the signature history storage service apparatus, and the step for verifying the validity of the digital signature, the signature history storage service apparatus performs:

a step comprising verifying the validity of the received public key certificate, and a step comprising checking whether or not the deposition request document is verified correctly by use of a public key of a user included in the public key certificate.

8. The method for managing a log list according to claim 6, wherein the digital signature issue side apparatus requests registration of the accepted log list every time when a digital signature is issued.

9. The method for managing a log list according to claim 6, wherein said verifying consistency is performed by calculating a hash value $h(Rn')$ of the signature issuing record $Rn'$, and confirming that the hash value $h(Rn')$ in the signature issuing record $Rn'+1$ is identical with the calculated $h(Rn')$.

* * * * *